March 27, 1962 K. O. BOSWORTH ET AL 3,026,896
REVERSIBLE VALVE STRUCTURE
Filed Sept. 3, 1959

INVENTORS
KENNETH O. BOSWORTH
THOMAS F. MATHESON
BY
Barlow & Barlow
ATTORNEYS

United States Patent Office 3,026,896
Patented Mar. 27, 1962

3,026,896
REVERSIBLE VALVE STRUCTURE
Kenneth O. Bosworth, Swansea, Mass., and Thomas F. Matheson, Barrington, R.I., assignors to George W. Dahl Company, Inc., a corporation of Rhode Island
Filed Sept. 3, 1959, Ser. No. 837,883
1 Claim. (Cl. 137—270)

The present invention relates to valves.

It is the general object of this invention to provide a valve assembly which is especially designed for controlling the flow of fluid through lines in such a way that the valve plug operation may be quickly and easily reversed. Basically the reversal relates to a conversion of the valve from a normally open valve to a normally closed valve, and in still another aspect the invention relates to a motor-type valve having a valve plug which may be connected to a movable plate either on one or the other side thereof to cooperate with two valve seats.

In general it is quite advantageous to have available a valve structure that can be readily converted from one operation to the other. This is particularly true in control systems where one may stock a certain type of valve and desire a particular type of operation therefrom for a certain application. If it were necessary to stock both normally opened and normally closed type of valve, then two inventories would have to be maintained. However, with the use of a convertible valve this is obviated and a simple inventory of control valves may be utilized.

Accordingly, it is a specific object of the present invention to provide a valve wherein the valve member is movable toward and away from a valve seat within a housing, which housing may be readily taken apart to change the valve member so that it will operate in conjunction with another seat.

In accordance with the present invention, a fluid control valve is provided with a valve housing which is made in two parts and has an inlet and an outlet basically in line with each other and a movable plate between said inlet and outlet ports, the plate mounting a valve plug which cooperates with the valve seats found at the inner edge of the inlet and outlet ports. Coupled to the movable plate is a positioning means consisting of basically a piston and ports are provided for communication to either side of the piston within the valve housing.

Figure 1:
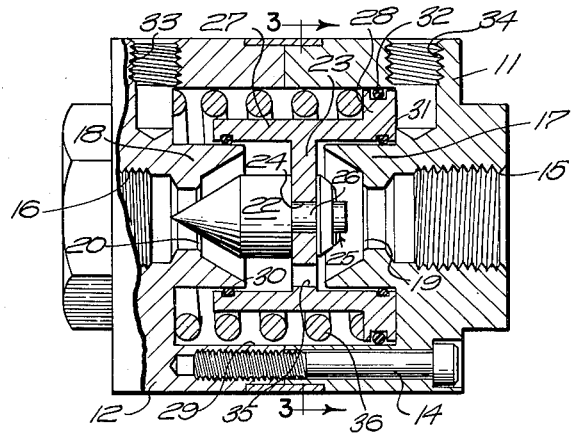
FIGURE 1 is a side elevational view partially broken away and in section of a valve embodying the present invention.
Figure 3:
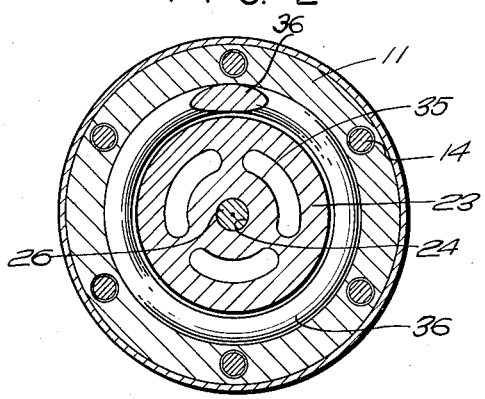
FIGURE 3 is a sectional view taken on lines 3—3 of FIG. 1.

Referring to the drawings in detail and initially to FIG. 1 thereof, the control valve embodying the present invention is shown as including a two-part housing consisting of halves 11 and 12. This housing is preferably cylindrical as shown in FIG. 3 and is provided with means for fastening the two sections 11 and 12 together, which means consist of fasteners 14 which for illustrative purposes are shown in FIG. 3 as being six in number. Disposed axially in each one of the sections 11 and 12 are ports 15 and 16 respectively which are provided with suitable connection means to external piping herein shown as being a threaded female connection. Inwardly of each of these ports 15 and 16, there is a boss 17 and 18 which provides a valve seat 19 and 20 respectively.

In the area defined between the valve seats 19 and 20, there is disposed a valve plug 22 which in FIG. 1 is shown as being movable toward and away from the valve seat 20. The valve plug 22 is carried by an actuating plate 23, the valve plug 22 being mounted substantially centrally thereof in a bore 24 by a fastening means generally indicated 25 and consisting of a washer and nut which is received on the stem 26 of the valve plug that extends through the bore 24. The outer edge of the actuating plate 23 is enlarged in an axial direction to form a cylindrical actuating member 27 which at one end thereof is further enlarged to form a boss 28. This actuating member 27 is adapted for movement in the space between the bosses 17 and 18 and the inner wall of the housings 11 and 12 which walls are commonly designated 29. Sealing means are provided on the cylinder 27 between the cylinder and the boss 18 as at 30, between the cylinder and the boss 17 as at 31 and between the inner wall 29 and the boss 28 as at 32. In effect, therefore, the actuating cylinder 27 forms a piston and communication is had to either side of the piston by the way of threaded bores 33 and 34. Thus, it will be seen that the plug is normally open but if pressure is applied to the bore 34, the cylinder 27 and plate 23 will be urged to the left as viewed in the drawing toward closed position against a restraining spring 36 which is disposed between the end wall of section 12 and the enlarged boss 28 and in the area defined between wall 29 and boss 18. In the normally open position as shown in FIG. 1, fluid may flow between the ports 15 and 16, the fluid flowing around the valve plug 22 and through suitable apertures 35 formed in the actuating plate 23 which apertures will be sized of a sufficient dimension to provide the requisite flow characteristics desired in the valve.

Figure 2:
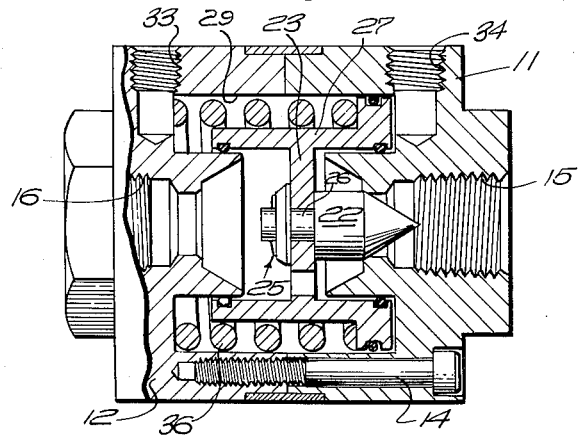
FIGURE 2 is a similar view showing the valve plug arranged for reverse operation from that of FIG. 1.

As seen in FIG. 2, the valve as described above has been reversed in operation so that it is in the normally closed position. To this end, the two housing members 11 and 12 may be taken apart by removal of the fastening means 14 to afford access to the fastening means 25 of the valve plug 22. The valve plug will be removed from the actuating plate 23 and positioned on the other side thereof so that it now faces the port 15 and normally engages the seat 19, being urged in this position by virtue of the spring means 36. In this alternate position, it will be appreciated that in order to open the communication between the ports 15 and 16, pressure must be applied to the bore 34 thereby moving actuating cylinder 27 to the left against the spring pressure as viewed in the drawing.

From the manner in which the valve is illustrated in the drawing, it will be apparent that in each case pressure is shown as being applied to bore 34 in order to achieve operation of the valve, the pressure in FIG. 1 closing the valve while in FIG. 2 it opens the valve. If for some reason, due to piping difficulties, it is desired to secure the same operation through bore 33, then it is quite apparent that by separating the two halves of the valve body 11 and 12 that the entire valve plug and actuating mechanism made up of parts 22, 23, 27 and 28 may be re-positioned in the valve body which will secure the same results but in opposite fashion.

We claim:

A control valve comprising a separable housing, each housing section having a valve port therein, said ports being in alignment and spaced apart to receive a valve plug therebetween, said housing sections defining a chamber, said chamber surrounding said ports, said ports defining valve seats, a cylindrical piston slidably received in said chamber, said piston having a plate oriented on a diameter thereof and having apertures providing fluid communication between said ports, resilient means urging said piston in one direction in said chamber, means to supply actuating fluid under pressure to one side of said piston and to exhaust from the chamber on the other side of said piston, said valve plug having means for removably and selectively mounting the same on said plate for sealing engagement with either one of said seats whereby said valve may be changed from a pressure-to-open to a pressure-to-close unit.

References Cited in the file of this patent
UNITED STATES PATENTS

| | | |
|---|---|---|
| 631,036 | Crump | Aug. 15, 1899 |
| 1,731,184 | Thomas | Oct. 8, 1929 |
| 2,663,319 | Marinelli | Dec. 22, 1953 |
| 2,911,994 | Branson | Nov. 10, 1959 |